May 26, 1970     P. P. WUESTHOFF     3,514,090

WORKPIECE POSITIONER

Filed July 19, 1967     3 Sheets-Sheet 1

INVENTOR
PAUL P. WUESTHOFF
BY
Cohn and Powell
ATTORNEYS

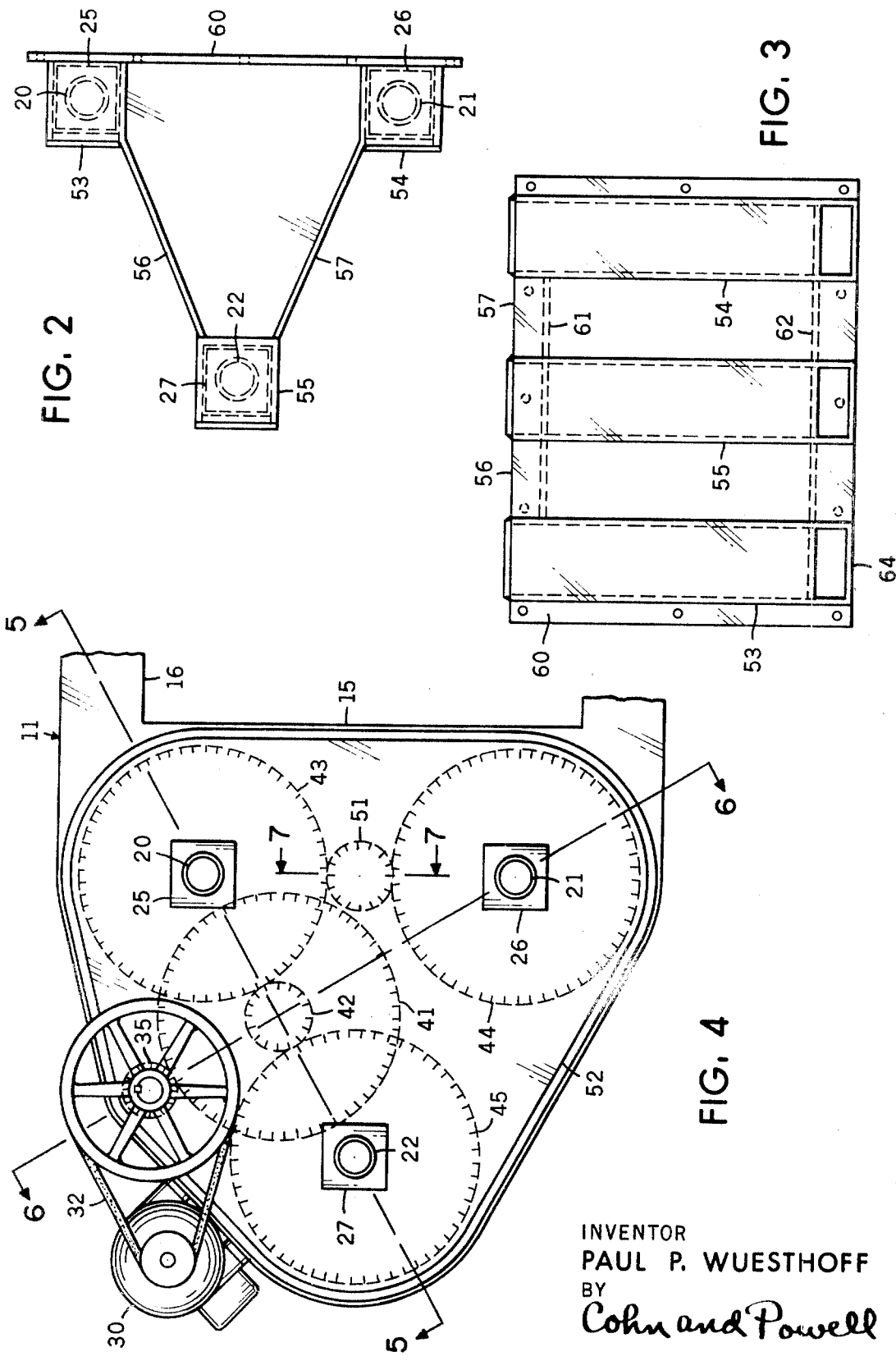

INVENTOR
PAUL P. WUESTHOFF
BY
Cohn and Powell
ATTORNEYS

United States Patent Office 3,514,090
Patented May 26, 1970

3,514,090
WORKPIECE POSITIONER
Paul P. Wuesthoff, St. Louis, Mo., assignor to The Pandjiris Weldment Co., St. Louis, Mo., a corporation of Missouri
Filed July 19, 1967, Ser. No. 654,511
Int. Cl. B23q 3/18
U.S. Cl. 269—60                      5 Claims

ABSTRACT OF THE DISCLOSURE

A positioner for supporting and adjusting the height and angular disposition of a workpiece which includes an elevation-adjusting mechanism operatively interconnecting a base and a frame. The elevation-adjusting mechanism incorporates a plurality of substantially vertical screws a nut threadedly engaging each screw to provide a jackscrew, and a drive mechanism relatively rotating the screws and associated nuts to urge the frame upwardly or downwardly with respect to the base. In one embodiment, three jackscrews are spaced substantially equi-distantly. A pair of jackscrews are aligned transversely to the general direction of lateral extent of a work-supporting portion carried by the frame, while the third jackscrew is located generally between the said pair of jackscrews and spaced therefrom in the general direction of lateral extent of the work-supporting portion.

BACKGROUND OF THE INVENTION

This invention relates generally to improvements in a workpiece positioner, and more particularly to improvements in an elevation-adjusting mechanism in a positioner of this type that is adapted to support workpieces during various fabricating operations such as welding and machining.

In the heretofore conventional positioners that support and adjust elevations and angular dispositions of a workpiece, columns and vertical support members extended above the worktable at least in certain adjusted elevations. Consequently, lateral extensions of the workpieces over the positioner and free access to the worktable were obstructed. This type of structure is shown in U.S. Pats. Nos. 698,896 and 1,701,963.

The positioner disclosed in U.S. Pat. No. 3,039,766 does provide support throughout a desired vertical range of movement without obstructing or interfering with free access to the worktable, and does enable the workpiece to project laterally beyond the worktable in any direction in all positions of vertical adjustment. However, the raising and lowering mechanism and the guided support consist of a multiplicity of expensive parts arranged in precise alignment that requires time-consuming, and hence costly, assembly and maintenance. The height-adjusting means includes a plurality of machined gear racks and cooperating pinions interconnected by gearing for operation, and machined tracks and coacting guide rollers interconnected by aligned and geared shafts. The elevating mechanism consist of vertical racks engaged by pinions. Without other structure, the racks and pinions would have free relative movement such that the table would fall. The locking structure that prevents the table from falling is physically remote from the zone of direct engagement of the racks and pinions.

SUMMARY OF THE INVENTION

The elevation-adjusting mechanism of the present workpiece positioner is completely different in structure and mode of operation from that disclosed in U.S. Pat. No. 3,039,766. The mechanism is relatively simple and inexpensive to manufacture, assemble and maintain. The multiplicity of parts, and the costly gears, racks, rollers, tracks and geared shafts in the elevating mechanism and guide means of the type required in the positioner disclosed in U.S. Pat No. 3,039,766 are eliminated. The mechanism for effecting elevation adjustment and for securely and rigidly supporting the worktable at various heights is wholly new in this field.

The workpiece positioner includes a frame mounted on a base, the frame having a work-supporting portion extending laterally outward. The elevation-adjusting mechanism operatively interconnects the base and frame, and includes a plurality of coacting screws and nuts providing jackscrews, and a drive mechanism relatively rotating the associated screws and nuts to urge the frame upwardly and downwardly with respect to the base.

The coacting screws and nuts, constituting the elevating mechanism, are self-locking to prevent the table from falling. No other structure is needed except the jackscrews that directly engage to adjust the table height, to support the table and to lock the table automatically in any adjusted height for safety. The self-locking screws and nuts directly engage at the zone of first application of load. There is no need for other locking structure remote from this zone, as in U.S. Pat. No. 3,039,766.

The screws of the jackscrews are rotatively mounted on the base, and the cooperating nuts are carried by the frame and constrained against rotation relative to the frame. The drive mechanism operatively connects and rotates the screws.

In a preferred embodiment, three equi-distantly spaced jackscrews are used. A pair of jackscrews are aligned transversely to the general direction of lateral extent of the work-supporting portion, while the third jackscrew is located therebetween and spaced therefrom in the general direction of lateral extent of the work-supporting portion.

The frame includes a plurality of rigidly interconnected sleeves receiving the screws, and means providing a non-circular chamber substantially at the bottom of each sleeve. The nuts of the jackscrews are non-circular and are disposed in the compatible non-circular chambers, the nuts being constrained against rotation relative to the frame. Three sleeves are provided in the preferred embodiment which are arranged substantially vertical and aligned with the screws. As the drive mechanism rotates the screws, the nuts travel along the screws and carry the frame selectively upward or downward with respect to the base, while the screws are respectively extended from or retracted in the sleeves.

BRIEF DESCRIPTION OF THE DRAWING

FIG. 2 is a top plan view taken on line 2—2 of FIG. 1;

FIG. 3 is a rear elevational view of the frame as seen from the left of FIG. 1;

FIG. 4 is a fragmentary, top view taken on line 4—4 of FIG. 1;

DESCRIPTION OF THE PREFERRED EMBODIMENT

Figure 1:
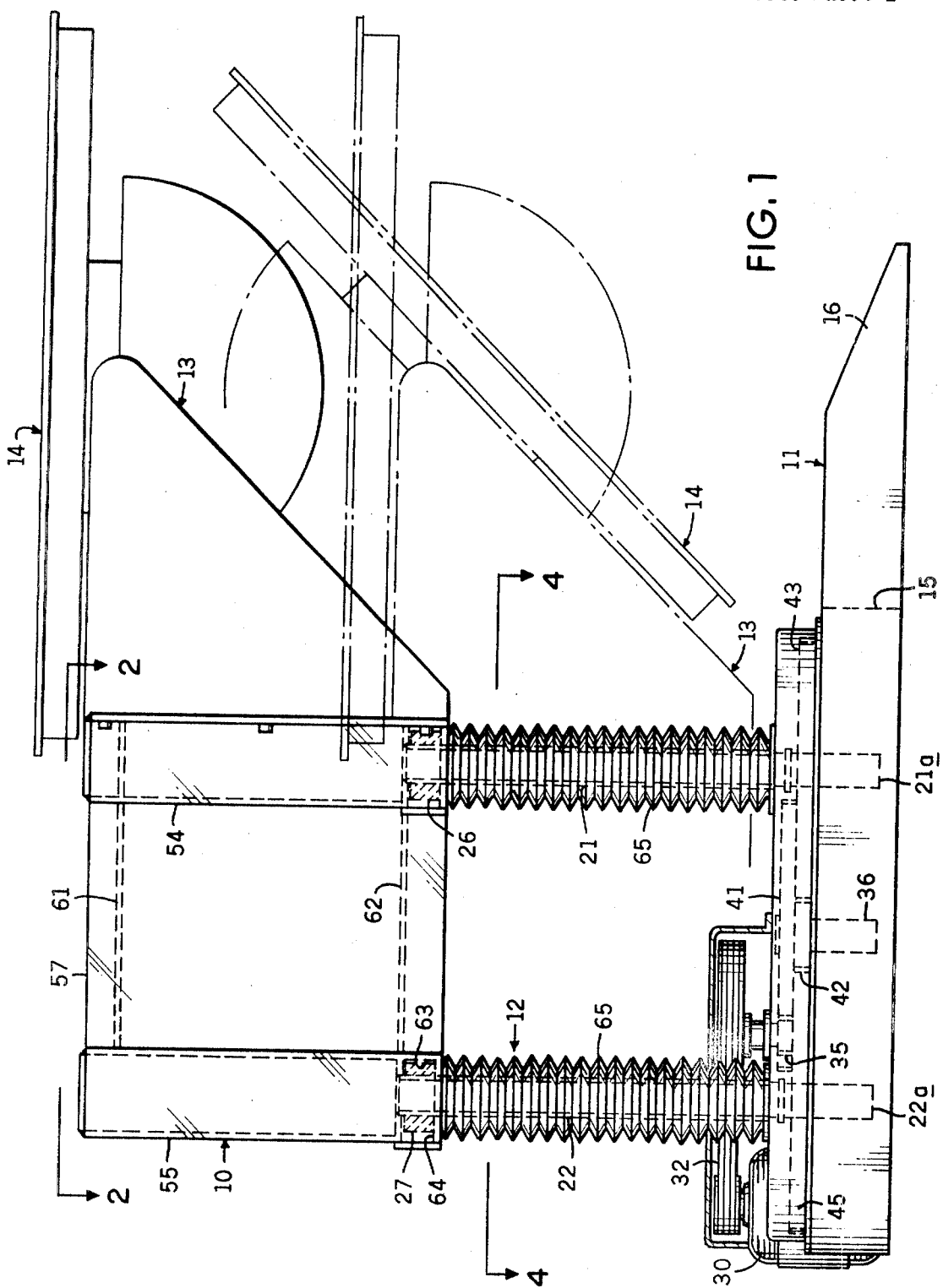
FIG. 1 is a side elevational view of the workpiece positioner.

Referring now by characters of reference to the drawings, and first to FIG. 1, it is seen that the workpiece positioner includes a frame generally indicated by 10 mounted on and over a cooperating base referred to by 11 by an elevation-adjusting mechanism generally indicated by 12. The frame 10 includes a laterally extending work-supporting portion 13 that incorporates a worktable 14. The elevation-adjusting mechanism 12 selectively raises and lowers the frame 10 relative to the base 11. The lower limit of the frame 10, together with its work-supporting portion 13, is illustrated by broken lines in FIG. 1.

The base 11 has a generally U-shaped configuration, and includes a rear base portion 15 with integral side feet 16 extending forwardly in the direction of lateral extent of the work-supporting portion 13. The base 11 has top and bottom, substantially parallel walls 17 and 18 respectively, enclosed at their peripheries by side wall 19.

The elevation-adjusitng mechanism 12 includes a plurality of substantially vertical screws 20, 21 and 22. In the preferred embodiment, a total of three screws are used. The screws 20–22 are spaced substantially equidistantly. A pair of the screws 20 and 21 are aligned transversely to the general direction of lateral extent of the work-supporting portion 13. The third screw 22 is located generally between the screws 20 and 21 and spaced rearwardly therefrom in the general direction of lateral extent of the work-supporting portion 13.

Figure 5:
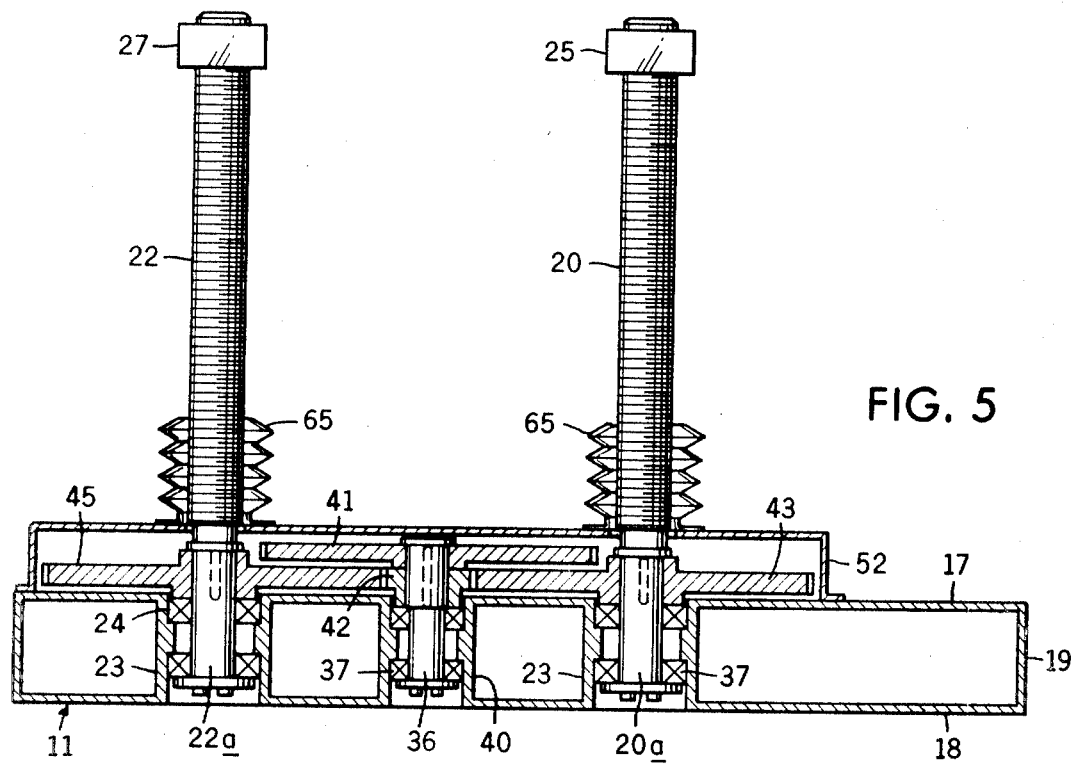
FIG. 5 is a cross-sectional view taken on line 5—5 of FIG. 4.
Figure 6:
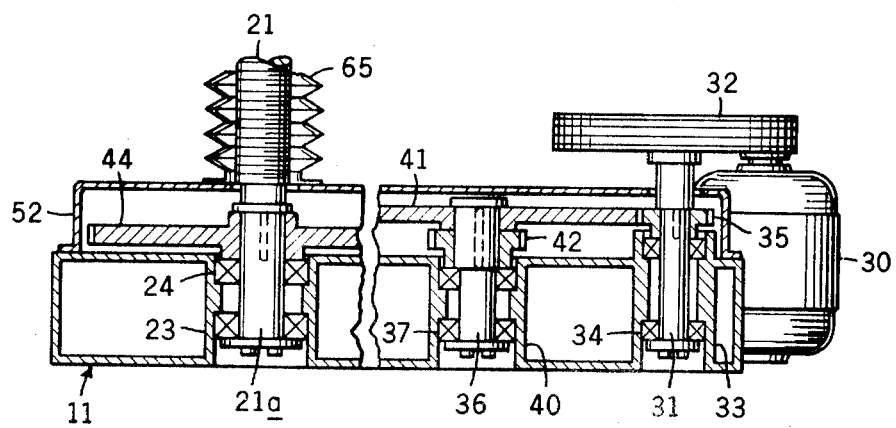
FIG. 6 is a cross-sectional view taken on line 6—6 of FIG. 4.

Each of the screws 20–22 includes an unthreaded stub shaft portion 20a, 21a and 22a respectively, rotatively mounted in the base 11. As is best seen in FIGS. 5 and 6, a cylindrical wall 23 bridges the top and bottom walls 17 and 18 of base 11 and surrounds each of the stub shaft portions 20a–22a. Thrust bearings 24, located in each of the cylindrical walls 23, rotatively mount each of the associated stub shaft portions 20a–22a.

A plurality of coacting nuts 25, 26 and 27 are carried by and threadedly engage the screws 20–22 respectively. In the preferred embodiment, a total of three nuts 25–27 is used. The nuts 25–27 are substantially square, and hence non-circular, in configuration. The purpose and function of the nuts 25–27 will be described in detail upon later description of parts.

From FIG. 6, it is seen that a drive mechanism for relatively rotating the screws 20–22 and cooperating nuts 25–27 respectively, includes an electric motor 30 mounted on and carried by the base 11, the motor 30 being operatively connected to a vertical drive shaft 31 by a suitable belt and pulley drive 32. An internal cylindrical wall 33 surrounds the drive shaft 31 and bridges the top and bottom walls 17 and 18 of base 11. Thrust bearings 34, disposed in the cylindrical wall 33, rotatively mount the drive shaft 31. Drivingly connected to and rotatable with the drive shaft 31 is a drive gear 35 located above the top wall 17 of base 11.

Rotatively mounted in the base 11 in a vertical plane between the rotational axes of screws 20 and 22, is a stub shaft 36. Specifically, the stub shaft 36 is rotatively mounted by thrust bearings 37 located in a cylindrical wall 40 between the top and bottom walls 17 and 18 of base 11. A large idler gear 41 is keyed to and rotates the stub shaft 36, the idler gear 41 meshing with the drive gear 35. Located immediately below the large idler gear 41 and keyed to the stub shaft 36 so as to rotate therewith, is a coacting, relatively smaller gear 42.

As is shown in FIGS. 5 and 6, driven gears 43, 44 and 45 are keyed to the stub shaft portions 20a, 21a, and 22a respectively of the screws 20–22. These driven gears 43–45 act to rotate the screws 20–22 respectively upon energization of the drive mechanism. The gear 42, rotated by the stub shaft 36, operatively meshes with the driven gears 43 and 45 so as to rotate these gears 43 and 45 in the same direction.

Figure 7:
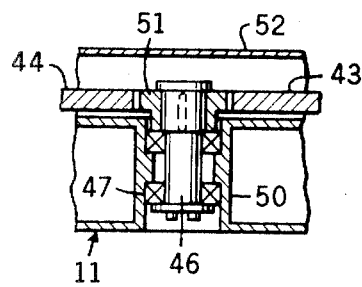
FIG. 7 is a fragmentary cross-sectional view taken on line 7—7 of FIG. 4.

Another stub shaft 46 (FIG. 7) is rotatively mounted in the base 11 in a vertical plane passed through the rotational axes of screws 20 and 21. The stub shaft 46 is rotatively mounted by thrust bearings 47 disposed in a cylindrical wall 50 between the top and bottom walls 17 and 18 of base 11. A gear 51 is keyed to and rotatable with the stub shaft 46, the gear 51 meshing with the driven gears 43 and 44. The driven gear 43 drives the intermediate, smaller gear 51, and consequently, the smaller gear 51 drives the driven gear 45 and hence drives the screw 21.

The gearing operatively interconnecting the drive shaft 31 with the screws 20–22 is located above the top wall 17 of base 11. A protective, relatively shallow housing 52 is disposed over this gearing and is attached to the top wall 17 of base 11.

The frame 10 that is selectively adjusted to different elevations above the base 11 includes a plurality of elongate, substantially vertical sleeves 53, 54 and 55 as is best shown in FIGS. 2 and 3. In the preferred embodiment a total of three sleeves is used, one for each of the screws 20–22. The elongate sleeves 53–55 are aligned with and receive the screws 20–22 respectively. For reasons which will later appear, the sleeves 53–55 have a substantially square cross-section. The sleeves 53–5 are rigidly interconnected by vertical side plates 56 and 57 and a front plate 60 to form a substantially triangular structure. A pair of internal reinforcing plates 61 and 62 extend horizontally between the side plates 56 and 57 and the front plate 60. One reinforcing plate 61 is located at the top of the frame 10, while the other plate 62 is located at the bottom.

The bottom end of each sleeve 53–55 is provided with a substantially square, and hence non-circular, chamber 63 that conforms substantially to the square configuration of each of the nuts 25–27. The square chambers 63 are located at the entrances to the sleeves 53–55, and receive the nuts 25–27. Because of this compatible, square relationship between the nuts 25–27 and the chambers 63, the nuts 25–27 are precluded from rotation relative to the frame 10. Each of the square chambers 63 is closed off at the bottom by a removable plate 64.

The work-supporting portion 13 of the positioner is attached to and carried by the front plate 60 of the frame 10 as is best shown in FIG. 1. It will be understood that the worktable 14 of the work-supporting portion 13 is located above the sleeves 53–55. In any adjusted, elevated position of the frame 10, a workpiece (not shown) mounted on the worktable 14 can extend laterally in any direction without hinderance from any portion of the frame 10 or the elevation-adjusting mechanism 12.

In the fully raised position of frame 10 relative to base 11, the screws 20–22 are relatively extended from the cooperating sleeves 53–55. In the fully lowered position, as indicated by broken lines in FIG. 1, the screws 20–22 are substantially fully retracted within the cooperating sleeves 53–55.

Disposed about each of the screws 20–22 is an expansible bellows 65. One end of each bellows 65 is attached to the bottom of frame 10, while the other end is attached to the top of housing 52. The bellows 65 extend and collapse automatically as the frame 10 is raised or lowered respectively. The bellows 65 constitute dust and protective shields for the screws 20–22.

It is thought that the functional advantages of the workpiece positioned has become fully apparent from the foregoing detailed description of parts, but for completeness of disclosure, the operation will be briefly described. It will be assumed that the positioner is completely assembled with the nuts 25-27 located within the frame chambers 63 and threadedly engaging the screws 20–22.

To elevate the frame 10 to an adjusted position relative to the base 11, the motor 30 is energized to turn the drive gear 35 in one direction. The drive gear 35 rotates the idler gear 41 and the interconnected smaller gear 42, the gear 42 in turn driving the driven gears 43 and 45 in the same angular direction. The gear 51, meshing with the driven gear 43, drives the other driven gear 44 in the same angular direction. Because the driven gears 43–45 are keyed to the stub shaft portions 20a–22a respectively, the screws 20–22 are turned synchronously in the same direction. As the screws 20–22 rotate, the cooperating nuts 25–27 respectively will travel up along the length of the screws 20–22 and carry the frame 10 with them in view of the fact that the nuts 25–27 cannot rotate relative to the frame 10. As the frame 10 rises, the screws 20–22 will extend from the associated frame sleeves 53–55. When the desired elevation is reached, the motor 30 is de-energized.

To lower the frame 10, the motor 30 is energized to rotate the screws 20–22 in the opposite direction. As the frame 10 lowers, the screws 20–22 will be relatively retracted in the associated sleeves 53–55.

Although the invention has been described by making detailed reference to a single preferred embodiment, such detail is to be understood in an instructive, rather than in any restrictive sense, many variants being possible within the scope of the claims hereunto appended.

I claim as my invention:

1. A positioner for supporting and adjusting the height and angular disposition of a workpiece, the improvement comprising:
   (a) a base means,
   (b) a frame means mounted on the base means,
   (c) the frame means including a work-supporting portion extending lateral outward,
   (d) an elevation-adjusting mechanism operatively interconnecting the base means and frame means, the elevation-adjusting mechanism including:
      (1) a plurality of substantially vertical screw members,
      (2) a nut member threadedly engaging each screw member to provide a jackscrew, and
      (3) a drive mechanism relatively rotating the screw members and associated nut members to urge the frame means upwardly or downwardly selectively with respect to the base means,
   (e) three jackscrews are provided, a pair of which are spaced equi-distantly and are aligned substantially transversely to the general direction of lateral extent of the work-supporting portion, and
   (f) the third jackscrew is located generally between the said pair of jackscrews and spaced therefrom in the general direction of lateral extent of the work-supporting portion,
   (g) the screw members of the jackscrews are rotatively mounted on the base means,
   (h) the nut members of the jackscrews are carried and constrained against rotation by the frame means, and
   (i) the drive mechanism operatively connects and rotates the screw members.

2. A positioner for supporting and adjusting the height and angular disposition of a workpiece, the improvement comprising:
   (a) a base means,
   (b) a frame means mounted on the base means,
   (c) the frame means including a work-supporting portion extending laterally outward,
   (d) an elevation-adjusting mechanism operatively interconnecting the base means and frame means, the elevation-adjusting mechanism including:
      (1) a plurality of substantially vertical screw members,
      (2) a nut member threadedly engaging each screw member to provide a jackscrew, and
      (3) a drive mechanism relatively rotating the screw members and associated nut members to urge the frame means upwardly or downwardly selectively with respect to the base means,
   (e) the screw members of the jackscrews being rotatively mounted on the base means,
   (f) the frame means being provided with non-circular chambers,
   (g) the nut members of the jackscrews being non-circular and located in the substantially compatible non-circular chambers, and being constrained against rotation relative to the frame means, and
   (h) the drive mechanism operatively connecting and rotating the screw members.

3. A positioner for supporting and adjusting the height and angular disposition of a workpiece, the improvement comprising:
   (a) a base means,
   (b) a frame means mounted on the base means,
   (c) the frame means including a work-supporting portion extending laterally outward,
   (d) an elevation-adjusting mechanism operatively interconnecting the base means and frame means, the elevation-adjusting mechanism including:
      (1) a plurality of substantially vertical screw members,
      (2) a nut member threadedly engaging each screw member to provide a jackscrew, and
      (3) a drive mechanism relatively rotating the screw mmebers and associated nut members to urge the frame means upwardly or downwardly selectively with respect to the base means,
   (e) the screw members of the jackscrews being rotatively mounted on the base means, and extending upwardly from the base means,
   (f) the frame means including:
      (1) a plurality of rigidly interconnected sleeves receiving the screw members, and
      (2) means providing a non-circular chamber substantially at the bottom of each sleeve,
   (g) the nut members of the jackscrews being non-circular and being disposed in the substantially compatible non-circular chambers, the nut members being constrained against rotation relative to the frame means, and
   (h) the drive mechanism operatively connecting and rotating the screw members.

4. A positioner for supporting and adjusting the height and angular disposition of a workpiece, the improvement comprising:
   (a) a base means,
   (b) a frame means mounted on the base means,
   (c) the frame means including a work-supporting portion extending laterally outward,
   (d) an elevation-adjusting mechanism operatively interconnecting the base means and frame means, the elevation-adjusting mechanism including:
      (1) a plurality of substantially vertical screw members,
      (2) a nut member threadedly engaging each screw member to provide a jackscrew, and
      (3) a drive mechanism relatively rotating the screw members and associated nut members to urge the frame members to urge the frame means upwardly or downwardly selectively with respect to the base means,
   (e) three jackscrews being provided, the jackscrews being spaced substantially equi-distantly,
   (f) the screw members of the jackscrews being rotatively mounted on the base means, and extending upwardly from the base means,
   (g) a pair of the jackscrews being aligned transversely to the general direction of lateral extent of the work-supporting portion,
   (h) the third jackscrew being located generally between the said pair of jackscrews and spaced therefrom in the general direction of lateral extent of the work-supporting portion,
   (i) the frame means including:
      (1) three sleeves rigidly interconnected and arranged substantially vertical to receive the three screw members, and (2) means providing a non-circular chamber substantially at the entrance of each sleeve, (j) the nut members of the jackscrews being non-circular and being retained in the compatible non-circular chambers to preclude rotation of the nut members relative to the frame means, and (k) the drive mechanism operatively connecting and rotating the screw members so that the nut members travel along the screw members and carry the frame means selectively upward or downward with respect to the base means, while the screw members are respectively extended from or retracted in the sleeves.

5. A positioner for supporting and adjusting the height and angular disposition of a workpiece, the improvement comprising:

(a) a base means, (b) a frame means mounted on the base means, (c) the frame means including a work-supporting portion extending laterally outward, (d) an elevation-adjusting mechanism operatively interconnecting the base means and frame means, the elevation-adjusting mechanism including:
  (1) a plurality of substantially vertical screw members,
  (2) a nut member threadedly engaging each screw member to provide a jackscrew, and
  (3) a drive mechanism relatively rotating the screw members and associated nut members to urge the frame means upwardly or downwardly selectively with respect to the base means, (e) the screw members extending upwardly from the base means, (f) journal means rotatively mounting the screw members in the base means, (g) the frame means including:
  (1) a plurality of elongate, substantially vertical sleeves, the sleeves having open ends through which the associated screw members extend into the sleeves,
  (2) means rigidly interconnecting the sleeves, and
  (3) means adjacent the sleeve ends providing noncircular chambers, (h) the nut members being non-circular and being retained in the compatible non-circular chambers to preclude rotation of the nut members relative to the frame means, (i) the drive mechanism connecting operatively and rotating the screw mmebers simultaneously in one angular direction so that the nut members travel down the length of the screw members to bring the frame means closer to the base means while the screw members are retracted and received in the sleeve, and in the other angular direction so that the nut members travel up the length of the screw members while the sleeves are relatively extended from the screw members, and (j) the work-supporting portion being located above the screw members and cooperating sleeves.

References Cited

UNITED STATES PATENTS

| | | | |
|---|---|---|---|
| 1,294,153 | 2/1919 | Parrish | 269—60 X |
| 2,477,169 | 7/1949 | Brekelbaum | 254—103 X |
| 3,082,607 | 3/1963 | Sutton | 254—103 X |

LESTER M. SWINGLE, Primary Examiner

D. R. MELTON, Assistant Examiner

U.S. Cl. X.R.

29—200; 254—103